F. HOLLEN & A. C. HOLLAND.
Corn-Shellers.
No. 137,842. Patented April 15, 1873.
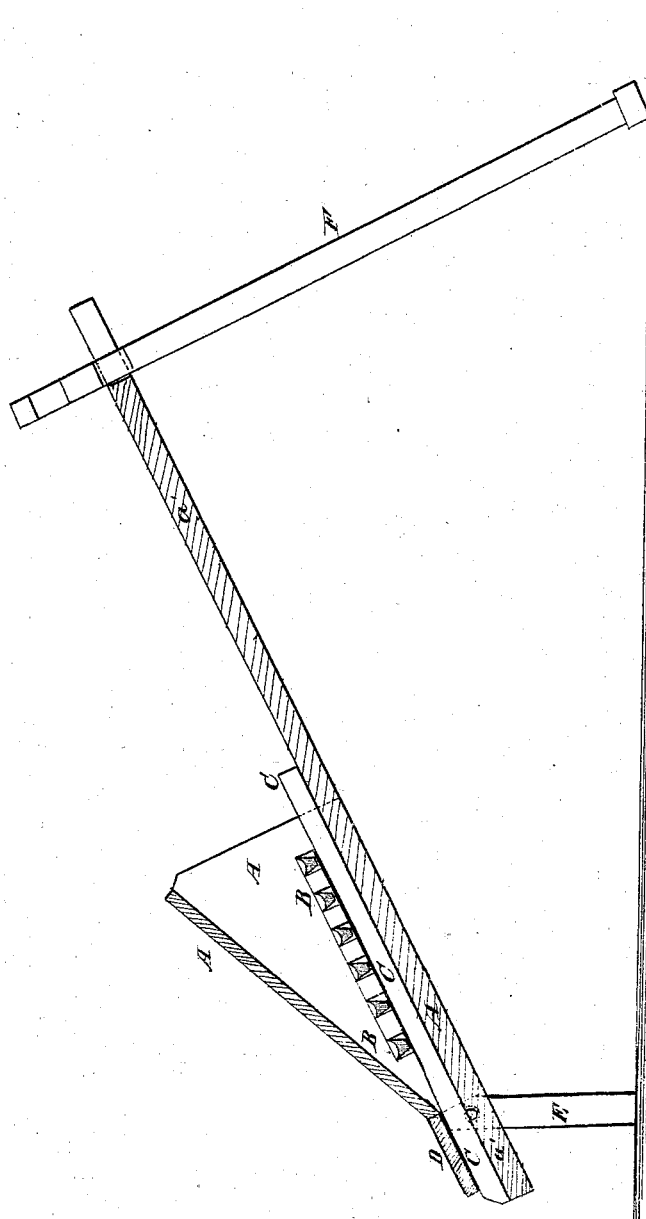

UNITED STATES PATENT OFFICE.

FRANKLIN HOLLEN AND AMOS C. HOLLAND, OF MARION, ILLINOIS.

IMPROVEMENT IN CORN-SHELLERS.

Specification forming part of Letters Patent No. 137,842, dated April 15, 1873; application filed February 15, 1873.

*To all whom it may concern:*

Be it known that we, FRANKLIN HOLLEN and AMOS C. HOLLAND, of Marion, in the county of Williamson and State of Illinois, have invented a new and useful Improvement in Hand Corn-Shellers; of which the following is a specification:

The figure is a detail vertical longitudinal section of our improved corn-sheller.

Our invention has for its object to furnish an improved hand corn-sheller, simple in construction, convenient in use, and effective in operation, enabling the corn to be shelled easily and rapidly. The invention consists in the shelling-grate constructed as hereinafter fully described, and in the combination of the box shelling-grate, the bars, the short legs, and the adjustable long leg with each other, as hereinafter fully described.

A represents a box made in the shape of a half-hopper, about thirty inches long, eight inches wide, and ten inches high at the upper end, and so high at the lower end as not to interfere with the hand when shelling the corn. The bottom $a'$ of the box A is extended so as to be about five feet long. B is the shelling-grate, which is formed by a number of bars fluted or concaved longitudinally upon their upper sides so that their side edges may be sharp to remove the corn from the cob. The ends of these bars are attached to and held in proper relative position by longitudinal bars. The rack B is attached to the bars C, which are secured in the side corners of the bottom $a'$ of the box A. The bars C extend below the ends of the sides and top of the box A and have a board, D, attached to the upper sides of said lower ends to form a neck or spout to guide the shelled corn into the bag or vessel prepared to receive it. The box A is placed in an inclined position, as shown in the figure, and its lower end is supported at a suitable height by two short legs, E. The upper part of the bottom board $a'$ may be made narrower and its upper end is supported at a proper height by a single long leg, F. The upper part of the leg F should be adjustably connected with the upper end of the board $a'$, so that the upper end of the machine may be conveniently raised and lowered, as required. This may be done by forming a short slot in the end of the board $a'$ and matching the side edges of the leg F to fit into the said slot, as shown in the figure.

In using the sheller, the ear of corn is passed into the box A, and drawn across the bars of the rack or grate B, the sharp edges of which quickly remove the kernels from the cob, the box A keeping the kernels from flying about, and guiding them into the bag or vessel placed to receive them.

Having thus described our invention, we claim as new, and desire to secure by Letters Patent—

1. The shelling-grate B formed of a series of transverse bars fluted or grooved upon their upper sides to form sharp or cutting edges, as specified.

2. The combination of the box A $a'$, shelling-grate B, bars C, short legs E, and adjustable long leg F, with each other, substantially as herein shown and described.

FRANKLIN HOLLEN.
AMOS C. HOLLAND.

Witnesses:
E. A. PHILLIPS,
N. B. CALVERT.